(12) United States Patent
Hardjono et al.

(10) Patent No.: US 6,738,900 B1
(45) Date of Patent: May 18, 2004

(54) METHOD AND APPARATUS FOR DISTRIBUTING PUBLIC KEY CERTIFICATES

(75) Inventors: Thomas Hardjono, Arlington, MA (US); Brad Cain, Cambridge, MA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/493,453

(22) Filed: Jan. 28, 2000

(51) Int. Cl.$^7$ ................................. H04L 9/00
(52) U.S. Cl. ............... 713/156; 713/160; 713/162; 713/163; 713/201; 709/235
(58) Field of Search .................. 713/162, 163, 713/156; 709/235; 380/283, 284

(56) References Cited

U.S. PATENT DOCUMENTS

| | | | |
|---|---|---|---|
| 5,519,704 A | 5/1996 | Farinacci et al. | 370/85.13 |
| 5,541,927 A | 7/1996 | Kristol et al. | 370/94.2 |
| 5,748,736 A * | 5/1998 | Mittra | 713/163 |
| 6,038,322 A * | 3/2000 | Harkins | 380/279 |
| 6,240,188 B1 * | 5/2001 | Dondeti et al. | 380/284 |
| 6,330,671 B1 * | 12/2001 | Aziz | 713/163 |
| 6,363,154 B1 * | 3/2002 | Peyravian et al. | 380/283 |
| 6,594,703 B1 * | 7/2003 | Li | 709/235 |
| 6,606,706 B1 * | 8/2003 | Li | 713/162 |

OTHER PUBLICATIONS

Farinacci et al., Internet Draft—deaft–ietf–msdp–spec–01.txt, Dec. 1999, IETF.*
Housley et al., RFC 2459—Internet X.509 Public Key Infrastructure, Jan. 1999, IETF.*
Blazevic et al., Distributed Core Multicast (DCM): a multicast routing protocol for manay groups with few receivers, ACM SIGCOMM, Vol. 29, Issue 5, Oct. 1999.*
"Protocol Independent Multicast–Sparse Mode: Motivation and Architecture", Internet Draft, www.ietf.org/internet–drafts/draft–ietf–idmr–pim–arch, 23 pgs, Aug. 4, 1998.
"Protocol Independent Multicast–Sparse Mode: Protocol Specification", Internet Draft, www.draft–ietf–idmr–pim–sm–specv2–00.txt, 95 pgs, Sep. 9, 1997.
"The Multicast Source Discovery Protocol" Internet Draft, www.draft–ietf–msdp–spec–01.txt, 24 pgs, Dec., 1999.
"Protocol Independent Multicast Routing", Internet Draft, www.ietf.org/internet–drafts/draft–eitf.pim.ipv6–01.txt, 6 pgs. 2/99.
"Multicast Source Discovery Protocol", Internet Draft, www.ietf.org/internet/drafts/draft–farinacci–msdp–00.txt, 8 pgs, Jun. 25, 1998.
"Internet x.509 Public Key Infrastructure", www.ietf.org/rfc/rfc/2459.txt, 105 pgs, 1/99.

* cited by examiner

*Primary Examiner*—Emmanuel L. Moise
(74) *Attorney, Agent, or Firm*—Fish & Richardson P.C.

(57) ABSTRACT

A method and apparatus for distributing key certificates across PIM-SM routing domains by MSDP messages. A rendez-vous point RP in a PIM-SM domain can have a MSDP peering relationship with other rendez-vous point RP's in other domains. The peering relationship is a transport control protocol (TCP). Each domain has a connection to the MSDP topology through which it can exchange control information with active sources and rendez-vous points RP's in other domains. The normal source-tree building mechanism in PIM-SM is used to deliver multicast data over an internet domain distribution tree.

20 Claims, 5 Drawing Sheets

METHOD AND APPARATUS FOR DISTRIBUTING PUBLIC KEY CERTIFICATES

BACKGROUND

This invention relates to distributing public key certificates to protocol-independent multicast domains.

A public key used in only one domain is called a semi-public key. In a protocol-independent multicast domain (PIM domain), PIM entities within the domain are configured to have a copy of the semi-public key. This is in contrast to a fully-public key, which is used globally in more than one domain. Whether a system employs semi-public keys or fully-public keys, inherent within any key management scheme is the need for public keys to be certified by an accepted Trusted Authority before they are used in a domain. For the fully-public keys, the Trusted Authority can be a well-known entity or Trusted Third Party which certifies public keys globally. Examples of these Trusted Third Parties include Entrust Technologies Inc. of Plano, Tex. and RSA Data Security Inc. of San Jose, Calif.

In a PIM domain, in particular a PIM sparse mode domain (PIM-SM domain), a domain key distributor DKD can serve the function of a Trusted Authority for semi-public keys within a specific domain. Domain key distributor DKD has the administrative responsibility of certifying the semi-public keys within the domain and publishing them to other domain entities. Assuming the domain key distributor DKD has a public key pair (secret key, "Skdkd", public key "Pkdkd"), certification of a semi-public key of a PIM-entity is conducted by the domain key distributor DKD digitally-signing that entity's public key using the domain key distributor DKD's secret key "Skdkd." Because each PIM entity is manually configured with the domain key distributor DKD's public key Pkdkd, the resulting certificate is verifiable by all PIM routers in possession of the domain key distributor DKD's public key. In other words, the domain key distributor DKD of a domain vouches for all PIM-entities in that domain.

However, this scheme does not work for inter-domain transactions, such as when a router in domain D2 wants to send a control message to an entity in domain D1. Even if the message was digitally signed by domain key distributor DKD2 in domain D2, the receiver entity in domain D1 is not able to verify the authenticity of the control message because it does not have the public key Pkdkd of the domain key distributor DKD2 in Domain D2.

SUMMARY

This invention uses a protocol, such as the Multicast Source Discovery Protocol (MSDP), to deliver public key certification between rendez-vous points RP's.

A rendez-vous point RP in a PIM-SM domain can have a MSDP peering relationship with other rendez-vous point RP's in other domains. The peering relationship is a transport control protocol (TCP) connection. Each domain has a connection to the MSDP topology through which it can exchange control information with active sources and rendez-vous point RP's in other domains. The normal source-tree building mechanism in PIM-SM is used to deliver multicast data over an inter-domain distribution tree.

In general, in one aspect, the invention features a system for sharing a plurality of public key certificates among a network of domains through MSDP. Each domain has a domain key distributor DKD for producing the plurality of public key certificates within the domain, and a rendez-vous point RP with a peering relationship with another rendez-vous point RP in another domain, the rendez-vous point-RP capable of generating MSDP messages configured to carry one or more key certificates of the plurality of public key certificates to the rendez-vous point of another domain.

Aspects of the invention can include one or more of the following features. The domains can be PIM-SM routing domains. The MSDP messages can be delivered to another domain by a TCP connection.

The MSDP messages can be source-active messages with a field extension containing one or more public key certificates. The source-active messages can be in TLV format. All routers in the domain can be configured with a public key of the domain key distributor DKD of the domain.

In another aspect, the invention features a method of delivering public key certificates from a sending domain to a receiving domain, each domain including a domain key distributor DKD with a key pair Pkdkd, Skdkd, a rendez-vous point RP and a plurality of routers. The method includes cross-certifying the domain key distributor DKDs of the sending domain and the receiving domain, producing a public key certificate for a router that sends inter-domain messages in the sending domain, delivering the public key certificate to the rendez-vous point RP of the sending domain, generating a MSDP message configured to carry the public key certificate, forwarding the MSDP message from the rendez-vous point RP of the sending domain to the rendez-vous point RP of the receiving domain, and propagating the public key certificate in the receiving domain.

Aspects of the invention can include one or more of the following features. Cross-certifying can consist of signing, by the domain key distributor DKD of the sending domain, of a public key certificate for the Pkdkd of the domain key distributor DKD of the receiving domain; announcing the public key certificate containing the Pkdkd of the receiving domain in the sending domain and the sending domain in the receiving domain; signing, by the domain key distributor DKD of the receiving domain, of a public key certificate for the Pkdkd of the sending domain, and announcing the public key certificate containing the Pkdkd of the sending domain in the receiving domain. Announcing can be conducted through multicast. The router sending inter-domain messages can be the rendez-vous point RP in the sending domain, and the certificate can be distributed to routers in a multicast group. The method of propagating can consist of verifying the certificate from the sending domain using the public key (Pkdkd) of the domain key distributor DKD of the sending domain, and distributing the certificate to routers in the receiving domain.

In another aspect, the invention is directed to a system having a first protocol-independent multicast sparse mode (PIM-SM) domain configured for a Multicast Source Discovery Protocol (MSDP) connection with a second PIM-SM domain, wherein the first domain is disposed to deliver key certificates generated within the first domain to the second domain through the MSDP connection.

Aspects of the invention can include one or more of the following features. The MSDP connection can comprise a TCP connection between a rendez-vous point RP in the first domain and a rendez-vous point RP in the second domain. The TCP connection can be protected from tampering by MD5 hash function. The rendez-vous point RP of the first domain can construct a source-active message configured to carry key certificates to the second domain through the TCP connection.

The key certificates can comprise semi-public key certificates wherein each certificate includes a semi-public key of a router in the first domain. The key certificates can be certified by a domain key distributor DKD of the first domain. The key certificates delivered to the second domain can be propagated in the second domain down a shared-tree rooted at a rendez-vous point RP of the second domain and to all routers in the second domain.

DETAILED DESCRIPTION

Figure 1:
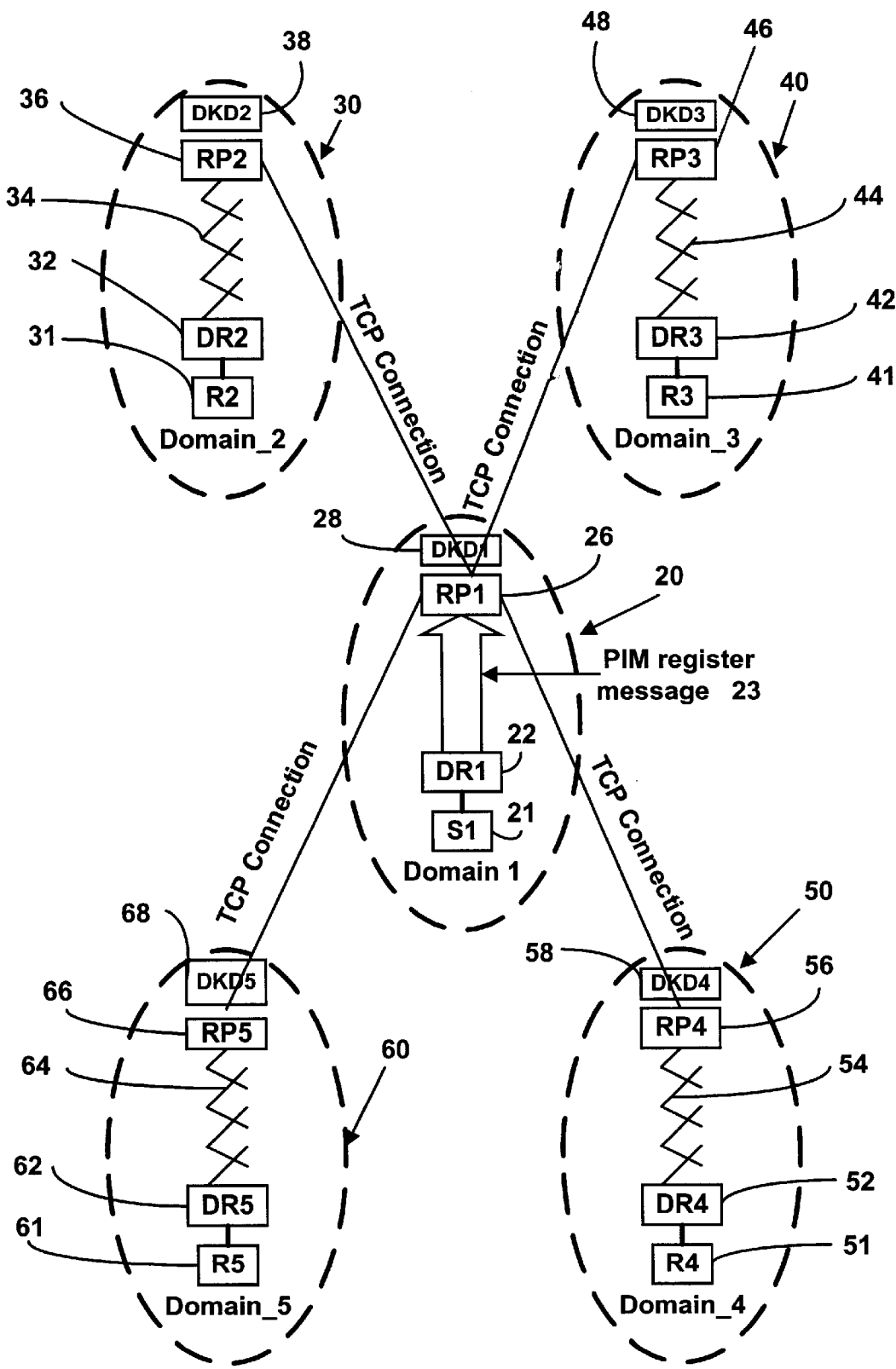
FIG. 1 is a diagram for inter-domain exchanges through MSDP.

Referring to FIG. 1, an arrangement of intercoupled domains 10 is shown. Messages are propagated across domain boundaries through MSDP. A source S1 21 in a PIM-SM Domain_1 20 originates traffic to a multicast group including receivers R2 to R5 (receivers 31, 41, 51 and 61) in domain_2 30 to domain_5 60. The PIM designated router DR1 22 directly connected to the source S1 21 sends the data encapsulated in a PIM register message 23 to rendez-vous point RP1 26 in Domain_1 20. Rendez-vous point RP1 26 constructs a "Source-Active" SA message and sends it to its MSDP peers in other domains, e.g., rendez-vous point RP2 36, rendez-vous point RP3 46, rendez-vous point RP4 56, and rendez-vous point RP5 66. Source-active MSDP messages are encapsulated in a TCP connection using well-known port 639. Other suitable well-known ports may similarly be used for this purpose as well. The receiving end of the MSDP peering relationship will listen to the well-known port while the transmitting end will conduct an active connect on the well-known port. After the data packets arrive at the rendez-vous point RP's in other domains, they are forwarded down shared-trees 34, 44, 54 and 64 inside the respective domains. For example, a MSDP message received in Domain_2 30 by rendez-vous point RP2 36 passes down the distribution tree 34 through designated router DR2 32 to receiver R2 31. The domains also includes domain key distributors (DKD) 28, 38, 48, 58 and 68. The system 10 uses the MSDP protocol to distribute PK-certificates across domains.

Figure 2:
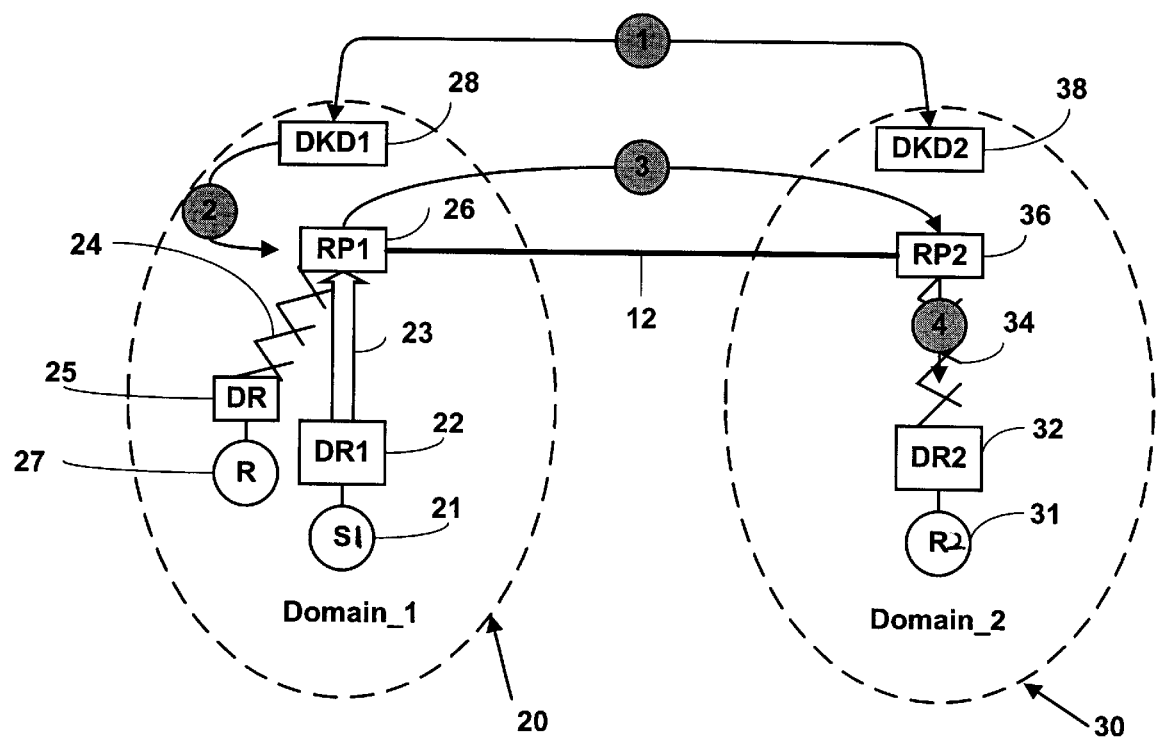
FIG. 2 is an overview diagram of key certificate distribution via MSDP.

Referring to FIG. 2, Domain_1 20 and Domain_2 30 are in communication across TCP connection 12. This invention can be practiced by a plurality of domains in communication with one another; however, only two of the domains of FIG. 1 are used in FIG. 2 to simplify the task of explanation. The structures and principles illustrated below can be easily generalized to two or more domains.

Domain_1 20 has a source S1 21 which originates traffic to a multicast group. Source S 21 is directly connected to designated router DR1 22, which is the highest IP addressed PIM router on a multi-access LAN. Normally, designated router DR1 22 sets up multicast router entries and sends corresponding join/prune and register messages on behalf of source S1 21. Designated router DR1 22 receives traffic originating from Source S1 21 and encapsulates the traffic in a PIM register message 23 and sends it to a rendez-vous point RP1 26.

Each multicast group has a shared-tree through which receivers and sources communicate. Rendez-vous point RP1 26 is such a root for the shared tree 24 through which receiver R 27 and source S 21 communicate within the domain. Receiver R 27 is directly connected to its own designated router DR 25. Finally domain key distributor DKD1 28 is the domain key distributor for Domain_1 20.

Connected to Domain_1 20 by TCP connection 12 is Domain_2 30. Rendez-vous point RP2 36 of Domain_2 30 is in a MSDP peering relationship with rendez-vous point RP1 26 of Domain_1 20. Domain_2 30 has a receiver R2 31 directly connected to designated router DR2 32. Receiver R2 31 is a member of the multicast group rooted at rendez-vous point RP2 36 and is connected to rendez-vous point RP2 36 through a shared tree 34. Domain_2 30 has its own domain key distributor DKD2 38.

As will be discussed later, FIG. 2 introduces several basic concepts of this invention. As shown, domain key distributor DKD1 28 and domain key distributor DKD2 38 cross-certifying each other in step 1. In one implementation of the invention, DKD1 28 and DKD2 38 are manually configured with each other's public key. Step 2 shows that, assuming Domain_1 20 is the sending domain, domain key distributor DKD1 28 will create a public key certificate for rendez-vous point RP1 26 because rendez-vous point RP1 26 sends inter-domain messages to the receiving Domain_$_2$30. Step 3 then shows that the key certificate for rendez-vous point RP1 26 is delivered to rendez-vous point RP2 36 in Domain_2 30 via the TCP connection 12. Upon verifying the certificate, rendez-vous point RP2 36 sends the certificate down the shared tree 34 to designated router DR2 32, which then forwards the certificate to receiver R2 31.

Figure 3A:
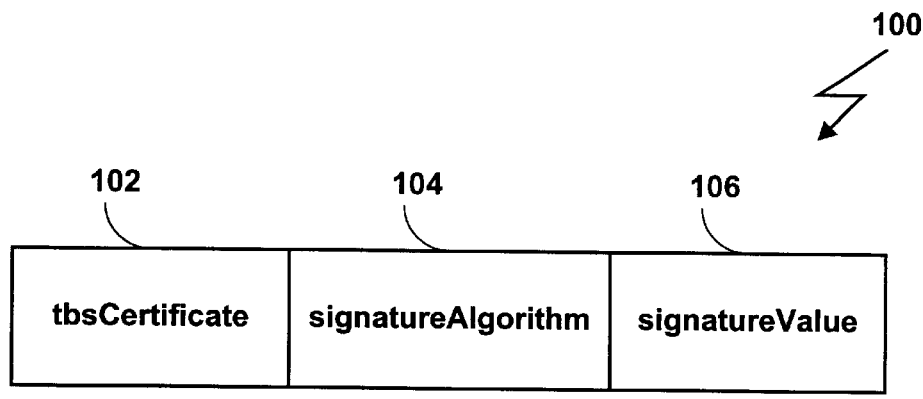
FIG. 3A is data structure diagram of a public key certificate.

Referring to FIG. 3A, the data structure of a public key certificate 100 is shown. For the purpose of illustration, it is assumed that the public key certificate will follow substantially the basic syntax of a X.509 v3 certificate. Other types of public key certificates can also be employed in other implementations of the current invention.

Figure 3B:
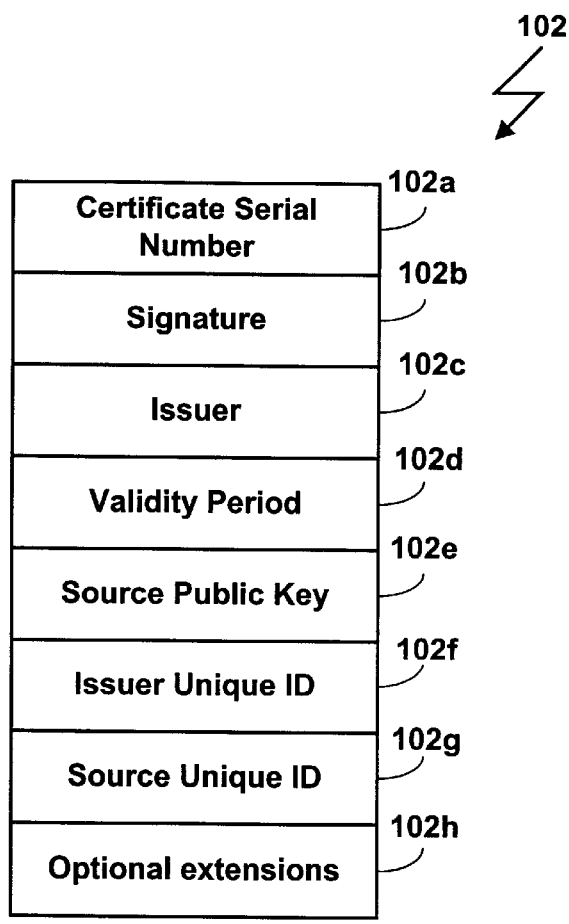
FIG. 3B is a data structure diagram of the tbsCertificate field of the public key certificate in FIG. 3A.

The certificate 100 has three basic fields, tbsCertificate 102, signatureAlgorithm 104, and signatureValue 106. The tbsCertificate 102 is explained in more details in FIG. 3B. The tbsCertificate field 102 contains the Certificate Serial Number 102a, which is an integer assigned by the issuer to certificate 100. Each certificate has a unique serial number. The tbsCertificate field 102 also contains the Signature 102b which is the algorithm identifier for the algorithm used by the issuer to sign the certificate. Signature 102b contains the same algorithm identifier as the signatureAlgorithm field 104. The tbsCertificate 102 also has an Issuer field 102c. The Issuer field 102c identifies the entity which has signed and issued the certificate 100. The Validity Period field 102d contains the time interval during which the issuer of the certificate warrants that it will maintain information about the status of the certificate 100.

Source Public Key 102e carries the bit string of the public key of an entity identified in Source Unique ID field 102g. Field 102e also identifies the algorithm with which the key is used.

Issuer Unique ID 102f provides the unique identifier of the issuer of the certificate 100. Source Unique ID 102g provides the unique identifier of the entity whose public key is contained in Source Public Key 102e. Optional extensions field 102h is an optional field that is a sequence of one or more certificate extensions. Some possible extensions include methods for associating additional attributes with users or public keys, or to designate the certificate as critical or non-critical.

A X.509 v3 certificate can be used in a wide variety of applications and environments covering a broad spectrum of interoperability goals, and therefore is chosen here to provide the basic format. However, this invention is not limited to the modified X.509 v3 format presented above, and may use other certificate formats.

Figure 4:
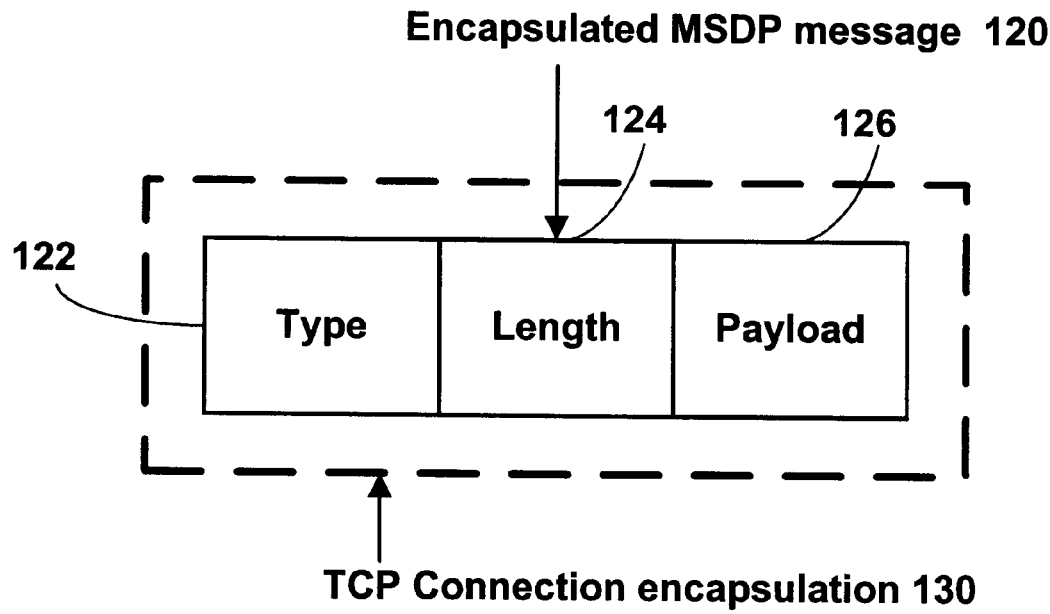
FIG. 4 is a data structure diagram of a prior art MSDP message.

Referring now to FIG. 4, an encapsulated MSDP message 120 in standard format is shown. As an illustration, a sample MSDP message 120 is encoded in Type Length Vector (TLV) format. MSDP message 120 is encapsulated in a TCP connection. TCP encapsulation is represented by dotted-line box 130. The MSDP message 120 has three fields: Type 122, Length 124 and Payload 126. The Type field 122 is usually up to 8 bits long and describes the format of the Payload field 126. For example, SA messages is of type 1 and has a value 1 in the field. The Length field 124 is usually up to 16 bits long and provides the length of the Type 122, Length 124 and Payload 126 fields in octets. The Payload field 126 is of variable length, and the format of this field depends on the value of the Type field 122.

Figure 5:
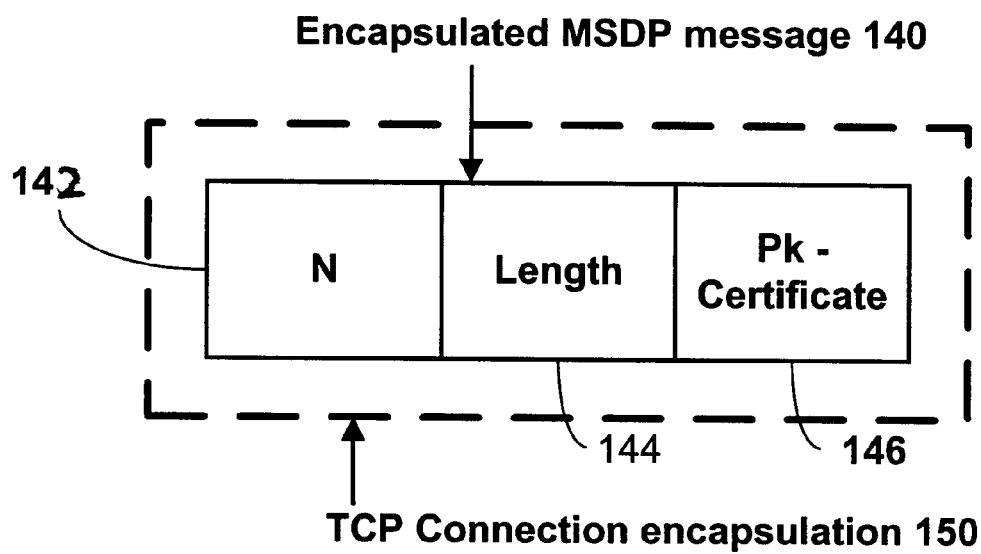
FIG. 5 is a data structure diagram of a MSDP message of this invention.

Referring to FIG. 5, the standard format shown in FIG. 4 can be adopted for use with transferring public key certificates. Assuming that rendez-vous point RP1 26 in FIG. 2 sends an inter-domain message containing its public key certificate produced by domain key distributor DKD1 28 from Domain_1 20 to Domain_2 30. Rendez-vous point RP1 26 constructs a source-active message to be sent to its MSDP peer rendez-vous point RP2 36 in Domain_2 30. MSDP message 140 will be encapsulated by a TCP connection, with TCP encapsulation represented by dotted box 150. MSDP message 140 has the three standard fields following the TLV format: Type field 142, Length field 144, and Payload field 146. In FIG. 5, the content in the Type field 142 is shown to be "N". The number N signifies a new type of MSDP message configured to carry public key certificate(s) across domains. The content in the Length field 144 is shown to be "Length," and the content in the Payload field 146 is shown to be "Pk-certificate," the public key certificate for rendez-vous point RP1 26 created by domain key distributor DKD1 28 following substantially the X.509 v3 format of FIG. 3. This represents one illustrative way in which public key certificates can be carried across domains by a MSDP message.

Figure 6:
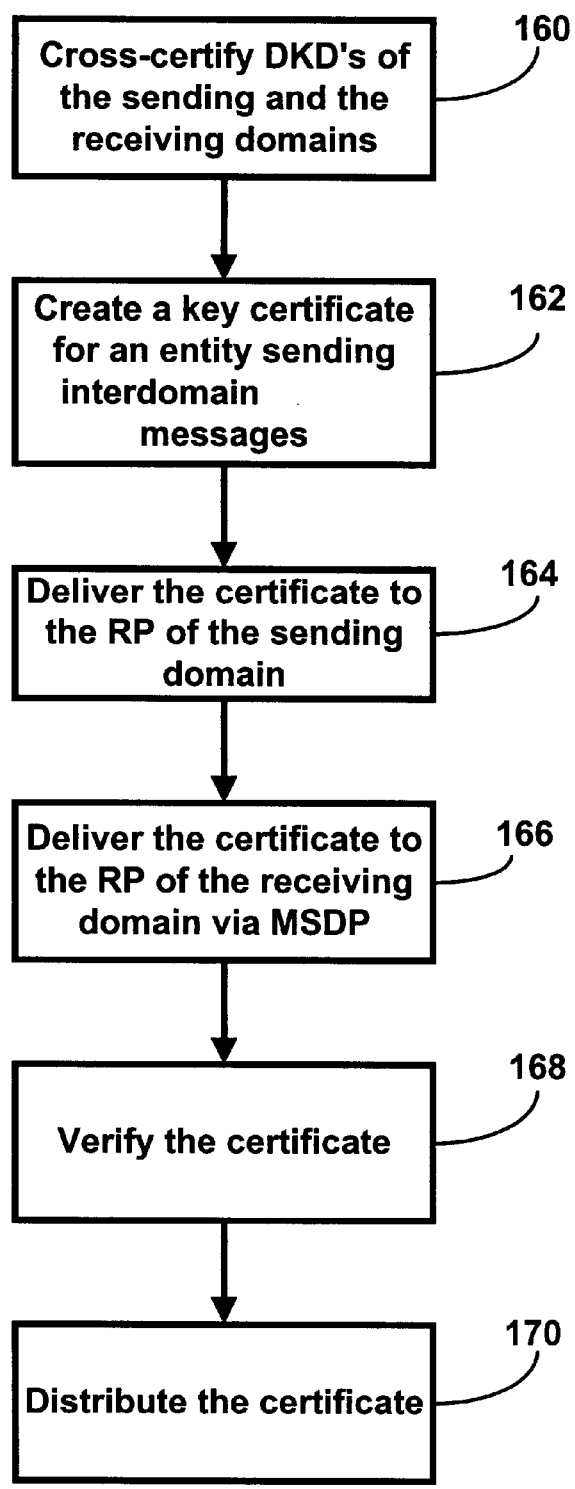
FIG. 6 is a flow diagram detailing the steps for distributing key certificates from a sending domain to a receiving domain.

Referring now to FIG. 6, a process to transfer public keys across domains is shown. The domain key distributor DKD1 28 of the sending domain_1 20 and domain key distributor DKD2 38 of the receiving domain_2 30 will cross-certify each other's public keys in step 160. Each domain's domain key distributor has a public/secret key pair Pkdkd, Skdkd. Within a domain, the domain key distributor DKD of the domain certifies the public keys used within its domain by digitally-signing the public key using its own secret key Skdkd. Because each PIM entity within the domain is manually configured with the domain key distributor DKD's public key Pkdkd, the resulting certificate is verifiable by all is routers in the domain. In the situation of cross-certifying across domain boundaries, domain key distributor DKD2 38 signs a certificate containing a public key Pkdkd1 of domain key distributor DKD1 28, and domain key distributor DKD1 28 signs a certificate containing a public key Pkdkd2 of domain key distributor DKD2 38. Domain key distributor DKD1 28 and domain key distributor DKD2 38 each announces the certificate from the other domain in its own domain after signing, either through multicasting or broadcasting.

For each entity in the sending domain_1 20 which will be sending inter-domain messages, domain key distributor DKD1 28 will produce, in step 162, a PK-certificate for that entity. As explained in FIG. 3, the Pk-certificate can follow substantially the X.509 v3 format, or other suitable certificate formats. For most situations, at least the designated router DR1 22 and rendez-vous point RP1 26 will be entities sending inter-domain messages.

After the Pk-certificate is produced, domain key distributor DKD1 28 delivers the certificate to rendez-vous point RP1 26 for forwarding to its MSDP peers, such as rendez-vous point RP2 36, in step 164. The rendez-vous point RP1 26 delivers the Pk-certificate to rendez-vous point RP2 36 in Domain_2 30 through MSDP via a TCP connection in step 166. This TCP connection has been minimally protected from tampering by mechanisms such as hash funtion Message Digest 5 (MD5), or other similarly suitable mechanisms.

The rendez-vous point RP2 36 verifies the delivered certificate from Domain_1 20 using the public key Pkdkd1 of domain key distributor DKD1 28 cross-certified by domain key distributor DKD2 38 in step 168. In step 170, rendez-vous point RP2 36 distributes the certificate to the entities in Domain_2 30 which are interested in multicast groups whose sources are in foreign Domain_1 20. Alternatively, rendez-vous point RP2 distributes the certificate to all routers in Domain_2 30.

The present invention has been described in terms of specific embodiments, which are illustrative of the invention and not to be construed as limiting. Other embodiments are within the scope of the following claims.

What is claimed is:

1. A system for sharing a plurality of public key certificates among a network of domains through Multicast Source Discovery Protocol (MSDP), wherein each domain comprises:
   a domain key distributor DKD for producing the plurality of public key certificates within the domain; and
   a first rendez-vous point with a peering relationship with a second rendez-vous point in a second domain, the first rendez-vous point capable of generating MSDP messages configured to carry one or more key certificates of the plurality of public key certificates to the second rendez-vous point of the second domain.

2. The system of claim 1, wherein the network of domain comprises protocol-independent multicast sparse mode (PIM-SM) routing domains.

3. The system of claim 1, wherein the MSDP messages are delivered to the second domain by a TCP connection.

4. The system of claim 1, wherein the MSDP messages comprise source-active messages with a field extension containing one or more public key certificates.

5. The system of claim 4, wherein the source-active messages are in Type Length Vector (TLV) format.

6. The system of claim 1, wherein the plurality of routers in the domain are configured with a public key of the domain key distributor.

7. A method of delivering public key certificates from a sending domain to a receiving domain, each domain including a domain key distributor DKD with a key pair Pkdkd, Skdkd, a rendez-vous point RP and a plurality of routers, comprising:

cross-certifying the domain key distributor DKDs of the sending domain and the receiving domain;

producing a public key certificate for a router that sends interdomain messages in the sending domain;

delivering the public key certificate to the rendez-vous point RP of the sending domain;

generating a Multicast Source Discovery Protocol (MSDP) message configured to carry the public key certificate;

forwarding the MSDP message from the rendez-vous point RP of the sending domain to the rendez-vous point RP of the receiving domain; and propagating the public key certificate in the receiving domain.

8. The method of claim 7, wherein cross-certifying further comprises:

signing, by the domain key distributor DKD of the sending domain, of a public key certificate for the Pkdkd of the domain key distributor DKD of the receiving domain;

announcing the public key certificate containing the Pkdkd of the receiving domain in the sending domain;

signing, by the domain key distributor DKD of the receiving domain, of a public key certificate for the Pkdkd of the sending domain; and announcing the public key certificate containing the Pkdkd of the sending domain in the receiving domain.

9. The method of claim 8, wherein the announcing step is conducted through multicast.

10. The method of claim 8, wherein the propagating step comprises:

verifying the certificate from the sending domain using the public key (Pkdkd) of the domain key distributor DKD of the sending domain; and distributing the certificate to the plurality of routers in the receiving domain.

11. The method of claim 10, wherein the certificate is distributed to routers in a multicast group.

12. The method of claim 7, wherein the router sending interdomain messages comprises the rendez-vous point RP in the sending domain.

13. A system comprising:

a first protocol-independent multicast sparse mode (PIM-SM) domain configured for a Multicast Source Discovery Protocol (MSDP) connection with a second PIM-SM domain, wherein the first domain is disposed to deliver at least one key certificate generated within the first domain to the second domain through the MSDP connection.

14. The system of claim 13, wherein the MSDP connection comprises a TCP connection between a first rendez-vous point in the first domain and a second rendez-vous point in the second domain.

15. The system of claim 14, wherein the TCP connection is protected from tampering by the MD5 hash function.

16. The system of claim 14, wherein the first rendez-vous point RP1 constructs a source-active message configured to carry the at least one key certificate to the second domain through the TCP connection.

17. The system of claim 16, wherein the at least one key certificate comprises a semi-public key certificate including a semi-public key of a router in the first domain.

18. The system of claim 13, wherein the at least one key certificate is certified by a domain key distributor of the first domain.

19. The system of claim 13, wherein the at least one key certificate delivered to the second domain is propagated in the second domain down a shared-tree rooted at the second rendez-vous point.

20. The system of claim 13, wherein the at least one key certificate delivered to the second domain is propagated in the second domain to all routers in the second domain.

* * * * *